United States Patent [19]

Coe et al.

[11] 4,026,454
[45] May 31, 1977

[54] NAILING MACHINES

[75] Inventors: Jack Coe, Birstall; Graham Frederick Price, Leicester, both of England

[73] Assignee: USM Corporation, Boston, Mass.

[22] Filed: Apr. 26, 1976

[21] Appl. No.: 680,577

[30] Foreign Application Priority Data

May 8, 1975 United Kingdom ............ 19323/75

[52] U.S. Cl. ............................... 227/151; 227/154
[51] Int. Cl.² ........................................... B27F 7/02
[58] Field of Search .......... 227/151, 152, 153, 154; 269/25, 26, 27, 31, 47, 49, 50, 51, 54.4, 54.5, 289 MR, 310

[56] References Cited

UNITED STATES PATENTS

| 731,488 | 6/1903 | Morgan | 227/154 |
| 2,320,684 | 6/1943 | Van Saun et al. | 227/153 |
| 2,639,427 | 5/1953 | Cable | 227/151 |
| 2,771,948 | 11/1956 | Thumim | 269/289 MR |

Primary Examiner—Granville Y. Custer, Jr.
Attorney, Agent, or Firm—Carl E. Johnson; Richard B. Megley; Vincent A. White

[57] ABSTRACT

The invention relates to nailing apparatus for use in making cable reel flanges or the like. Apparatus according to the invention comprises a rotatable element housed in a work support table of the apparatus and movable to cause a work-engaging surface of the element to raise a workpiece from a support surface of the work support table into a position in which the work-engaging surface supports the workpiece and provides a turning center so that the workpiece can be easily turned relative to nailing means of the apparatus.

8 Claims, 5 Drawing Figures

Fig_1

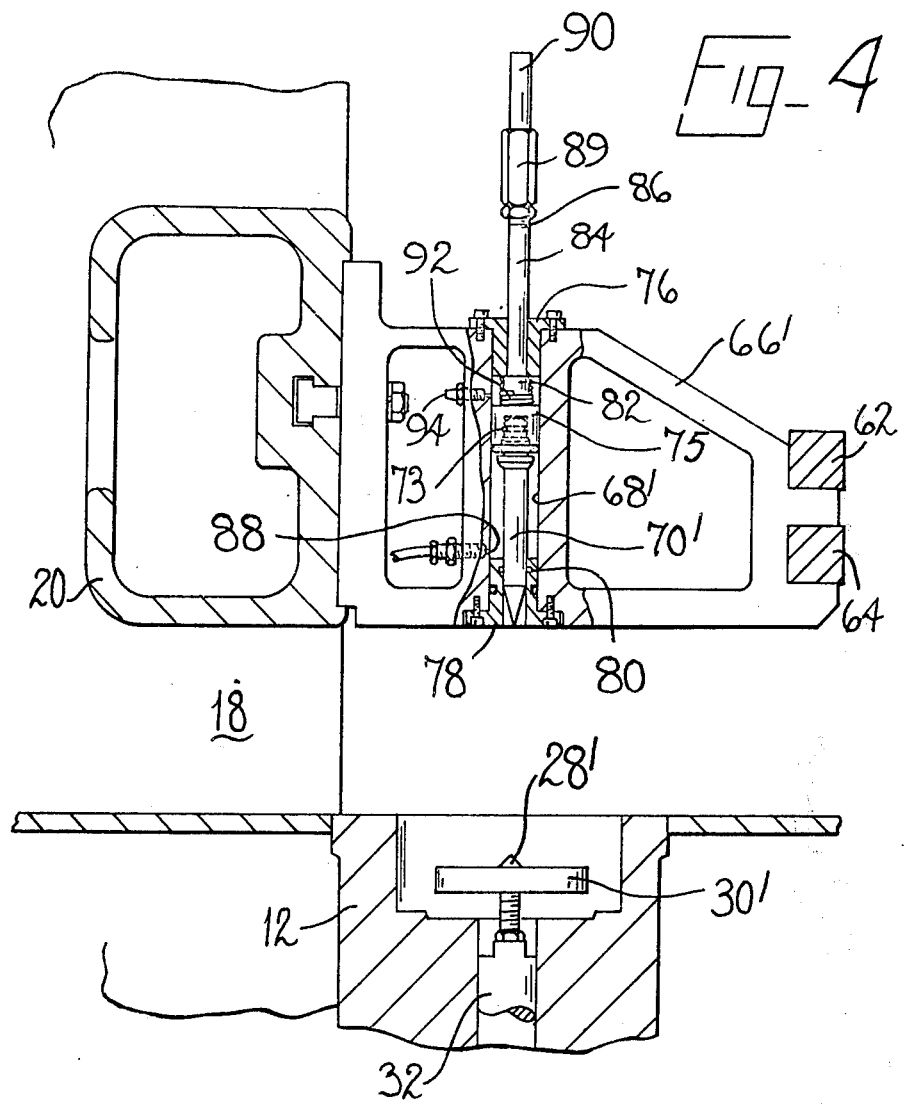

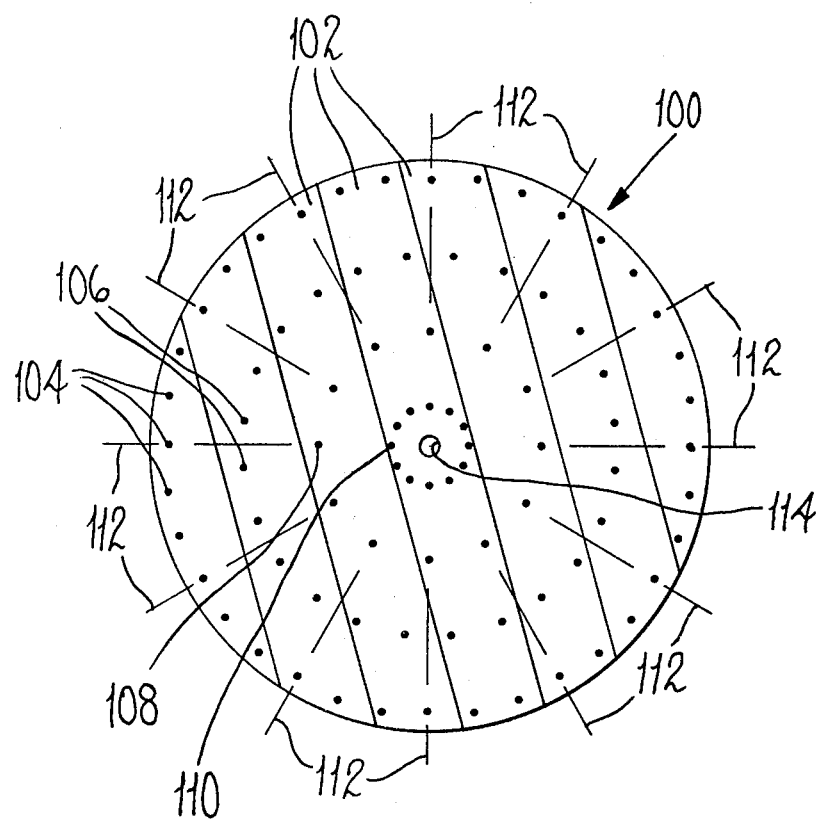
Fig_5

NAILING MACHINES

BACKGROUND OF THE INVENTION

This invention concerns nailing apparatus for use in making cable reel flanges or the like. By the expression "cable reel flanges or the like" is intended any workpiece which requires the insertion thereinto of a pattern of nails which is repeated in segments of the workpiece such that the workpiece can have the nails inserted by being turned about an axis to bring said segments successively into position opposite nail inserting means arranged to insert said pattern of nails. Such workpieces are generally circular or, as in the case of cable reel flanges, intended to be cut to a circular shape. Although the apparatus to which the invention is applicable is referred to as "nailing apparatus," it is to be understood that the invention is equally applicable to apparatus intended to insert other types of fastener, for example screws and staples.

In the manufacture of cable reel flanges, it is customary for an assembly consisting of a plurality of layers of wooden planks, each layer comprising a number of planks, to be nailed together, the planks being of various lengths according to their position in the assembly so that they form an assembly having a general shape which can, subsequently to the nailing operation, be cut into a circular shape with a minimum of waste. The phrase "cable reel flange" where used herein is to be understood as including not only finished cable reel flanges, for instance as herein illustrated, but also such flanges in the course of their manufacture, and especially including an assembly as referred to above.

For nailing cable reel flanges together, it is customary to use a nailing apparatus comprising a work support table on a surface of which a cable reel flange to be operated upon can be supported, fastener driving means, and means providing a turning centre about which a cable reel flange supported on the work support table can be indexed, in order to present successive portions of the cable reel flange to the fastener driving means. Usually the fastener driving means includes a plurality of hammer arrangements and nail feed arrangements, which are arranged in a segmental pattern so that the flange can be nailed progressively in segments by turning it between successive nailing operations about the turning center.

Two different means providing a turning center are used conventionally in such nailing apparatus, a first of which is a so-called spike, which is driven into the under-side of the flange, at a central point thereof, and the flange is thus impaled on the spike, while the other is a locating element in the form of a so-called drum locating pin, which is constructed to enable insertion into an aperture formed therefor in a central portion of the cable reel flange. Where a spike is used, customarily a further spike is aligned immediately above and depends downwardly, this further spike serving to center the flange in a desired position prior to its being impaled on the lower spike, and the further spike itself also being driven into the flange so that the two spikes form a turning center.

The provision of a turning center using either of the locating elements mentioned above does not, however, in itself facilitate the turning of the flange on the work support table. Especially in the case of large cable reel flanges, the flanges are both cumbersome and heavy to handle, and it is often the case that two or even three workers are required to index the flange round, even though only one operative is required for controlling the operating of the apparatus. In order to facilitate such indexing, it has been the practice to provide, spaced apart over the surface of the work support table, a plurality of work-supporting ball members, each accommodated in a housing therefor, such ball members projecting slightly above the surface of the work support table and being capable of revolving within their housings in any desired direction. These ball members, however, are restrained against heightwise movement so that each nailing operation causes the flange to be pressed on to the upstanding portions of the ball members with a result that the surface of the flange is dented by the ball members, thus rendering it more difficult to initiate further indexing of the flange. Furthermore, the ball members are not provided in an area across the width of the flange corresponding to the nailing area, so that a substantial part of the flange is unsupported by ball members entirely.

BRIEF SUMMARY OF THE INVENTION

It is one of the objects of the invention to provide nailing apparatus for use in making cable reel flanges or the like in which indexing of workpieces between successive nailing operations is facilitated.

With the above and other objects in view, the invention provides a nailing apparatus for use in making cable reel flanges or the like comprising a work support table having a support surface on which a cable reel flange having portions which require nailing can be supported, nailing means operable to insert nails into a portion of a workpiece supported on said surface of the work support table, a rotatable element having a work-engaging surface and a work-engaging projection extending from the work-engaging surface, the rotatable element being housed in the work support table, and means for moving the work-engaging surface of the rotatable element to raise a workpiece from the work support table into a position in which the work-engaging surface supports the workpiece and its projection provides a center about which the workpiece can be turned between operations of the nailing means to present said portions of the workpiece successively to the nailing means.

It will thus be appreciated that, as the invention provides a facility for lifting the central region of a workpiece, the whole mass of the workpiece tends to be supported centrally and thus indexing of the workpiece is substantially facilitated. In order further to facilitate indexing, conventional ball members as referred to above may be used, but preferably a plurality of work-supporting ball members is used each of which is urged by air under pressure into an operative position in which it projects slightly above the support surface of the work support table. As with the rotatable element, such ball members are caused to move out of their operative position when the nailing means is caused to operate.

The rotatable element is preferably mounted for rotation and further conveniently is supported by air pressure operated means, air under pressure being constantly applied during operation of the apparatus to the air pressure operated means to urge the element in a direction to raise a workpiece as aforesaid. The pressure thus applied is sufficient to allow the element, with its work-engaging surface in contact with the underside of a workpiece to raise the workpiece during indexing, while allowing the element to yield when a nailing operation of the apparatus is effected. Similarly, air under pressure is applied constantly to the ball members, the pressure thereof being sufficient to allow the ball members to support a workpiece during indexing of such workpiece, but allowing the ball members to yield out of their operative condition when a nailing operation of the apparatus is effected.

The nailing means preferably comprises a plurality of hammer arrangements mounted on a movable support arrangement to bring the under-side of each hammer arrangement into surface contact with a cable reel flange supported on the work support table. Furthermore, when the apparatus is thus in use, the air pressure applied through the air pressure operated means as aforesaid, and also the air pressure applied to the ball members as aforesaid, are so selected as to allow the element and the ball members to yield as aforesaid when the support arrangement is moved to bring the under-side of the hammer arrangements into surface contact with the cable reel flange as aforesaid and thus apply pressure thereto. The air pressure of course has to be selected according to the weight of the cable reel flange being operated upon.

The air pressure operated means by which the rotatable element is supported preferably comprises a piston and cylinder arrangement incorporated in a circuit which also includes a pressure regulator valve, by means of which the air pressure can be set according to a cable reel flange to be operated upon, and a pressure relief valve, by which any increase in the pressure in the piston and cylinder arrangement, due to movement of the element out of its operative position, can be relieved.

The invention is applicable to apparatus in which the rotatable element is in the form of a spike and also apparatus in which said element is in the form of a drum locating pin. In both instances, the element is provided with a flange, constituting a work-engaging surface of the elements, centrally of which is disposed a work-engaging projection, which may thus be in the form of a spike or a locating pin. Where a drum locating pin is used, the projection is constructed to enable insertion into an aperture formed therefor in a cable reel flange to be operated upon, with the flange of the element engaging an area of the under-side of the cable reel flange surrounding the aperture formed therein. Of course, such element is exchangeable according to the dimensions of the aperture formed in the cable reel flange to be operated upon.

In order to ensure that the central region of a cable reel flange to be operated upon is urged downwardly, when the support arrangement for the hammer arrangements moves downwardly as aforesaid, it has been found to be desirable positively to press the cable reel flange in such region, since, it will be appreciated, there are no hammer boxes in close proximity with the locating element. Thus, in an apparatus employing a drum locating pin, preferably the support arrangement for the hammer arrangements carries a presser member arranged opposite the drum locating pin, whereby, as the support arrangement moves, in the operation of the apparatus, to bring the under-side of each hammer arrangement into surface contact with the cable reel as aforesaid, the pressure member also moves into such surface contact, thus to ensure that the central region of said cable reel flange is urged against the air pressure applied thereto as aforesaid.

It will thus be appreciated that, in using an apparatus, in accordance with the invention, a cable reel flange is supported in such a manner as to facilitate indexing thereof between successive nailing operations; indeed, the operator of the apparatus is able alone to effect such indexing. Furthermore, handling of the flange on to and off the work support table is facilitated, and in addition, in an apparatus which employs a drum locating pin as above described, means is provided for centralising the flange at the start of a nailing sequence.

BRIEF DESCRIPTION OF THE DRAWINGS

In the accompanying drawings:

FIG. 4 is a view similar to FIG. 2 but showing a modification wherein a spike replaces a drum locating pin; and FIG. 5 is a plan view of a cable reel flange showing nails as positioned therein according to one illustrative pattern resulting from use of the embodiment.

DESCRIPTION OF THE PREFERRED EMBODIMENT

Figure 3:
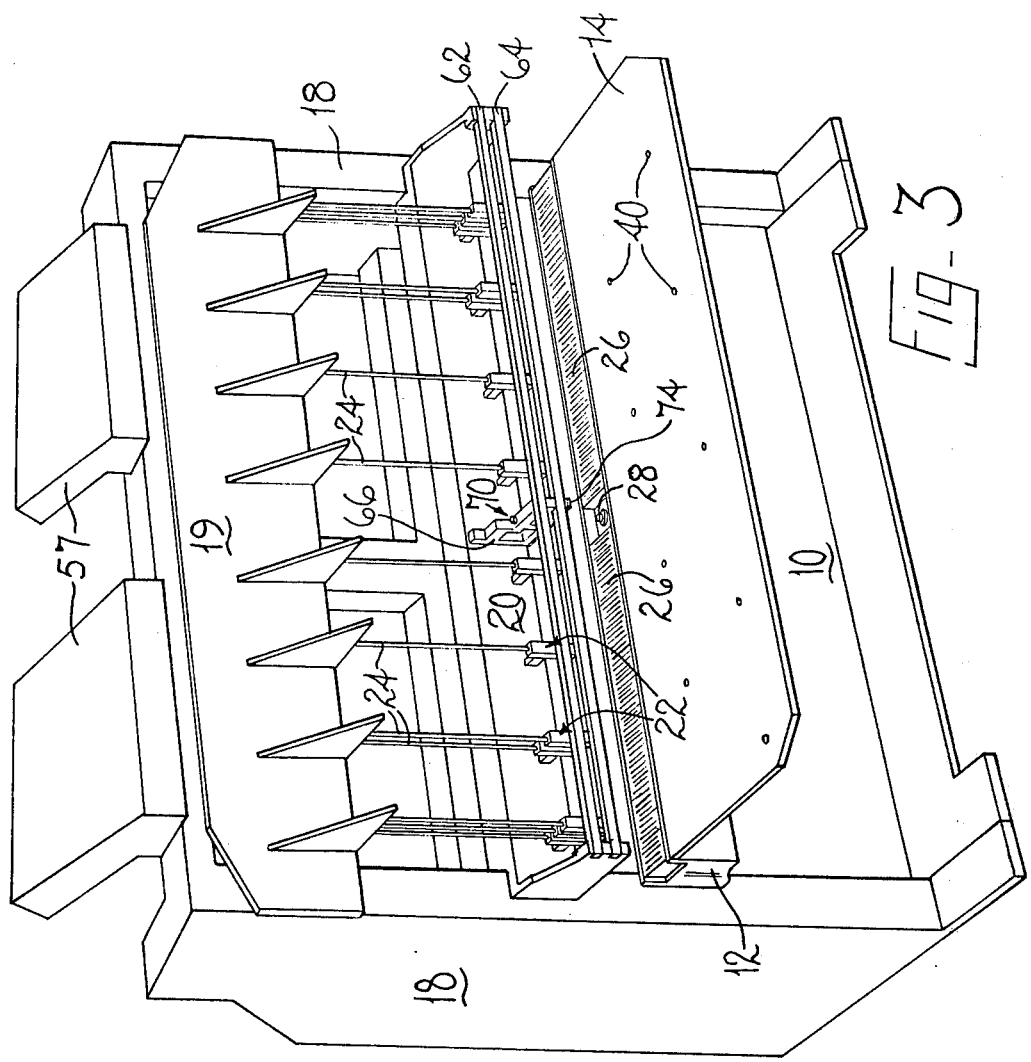
FIG. 3 is a perspective view of the preferred embodiment of the invention.

The preferred apparatus is a nailing apparatus for use in nailing cable reel flanges or the like. The apparatus comprises a main casting 10 (FIG. 3), integral with which is a work support block 12 which, together with front and rear table extensions 14,16, constitutes a work support table of the apparatus. Secured to the main casting 10 are side frames 18 which carry, for heightwise sliding movement thereon, a support beam 20 on which a plurality of hammer arrangements generally designated 22 are supported. The side frames 18 also support, also for sliding heightwise movement, a hammer actuator beam 19 (FIG. 3) by which drivers 24 of the hammer arrangements 22 are actuated, as will be hereinafter described. The apparatus comprises means (not shown) for moving the beam 20 and the actuator beam 19 heightwise on the side frames 18. The support beam 20, hammer arrangements 22 and actuator beam 19 together constitute nailing means of the apparatus operable to insert nails into a portion of a flange supported on an upper, support, surface of the work support table.

The work support block 12 provides a slideway, extending across the width of the support block, for two bars 26 (one only shown in FIG. 1), which bars are movable in a direction widthwise of the apparatus during a nailing operation in order to bend the ends of the nails which are driven into the cable reel flange being operated upon. Between the two bars 26 is a gap through which a drum locating pin or spike can project. In the preferred apparatus, a drum locating pin 28 is provided having a flange 30, the latter constituting a work-engaging surface and the former a work-engaging projection, and the drum locating pin itself constituting a rotatable element housed in the work support table. The pin 28 is threadedly secured on a cylindrical block 32 which is accommodated, for rotational movement, in a bore formed in the block 12. At its lower end, the block 32 is supported on a part-spherical end 33 (FIG. 1) of a piston rod 34 of a pneumatic piston 36 and cylinder 38 arrangement which is located in a recess of the block 12.

The piston and cylinder arrangement 36, 38 is connected, through a flow control valve (not shown), to a pressure regulator valve (not shown) by which the pressure of air applied through said piston and cylinder arrangement can be regulated. The pressure regulator valve also incorporates a pressure relief valve (also not shown) so that if any tendency for the pressure in the piston and cylinder arrangement to increase, e.g. by compression caused by the drum locating pin 28 being forced downwardly, can be relieved, so that a constant pressure can be maintained.

In the operation of the apparatus, air under pressure applied to the piston and cylinder arrangement 36,38 is effective to raise the drum locating pin 28 so that the flange 30 thereof is above the support surface of the work support table, the pressure being so regulated that upon pressure being applied to an upper surface of a cable reel flange being operated upon through the hammer arrangements 22, the drum locating pin will yield to a retracted position in which the flange 30 is no longer projecting above the support surface of the work support table. The raising of the pin 28 raises a workpiece from the table to a position in which the flange 30 supports the workpiece.

Figure 2:
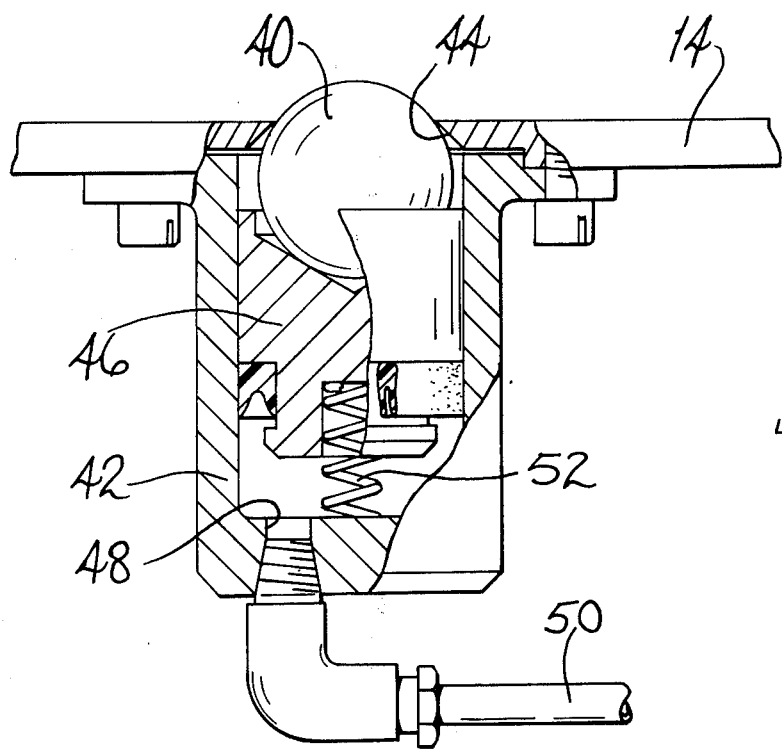
FIG. 2 is a fragmentary view of a workpiece-supporting ball member of the apparatus shown in FIG. 1.

The front and rear extensions 14,16 of the work table are provided, spaced about over the surface thereof, with a plurality of work-supporting ball members 40 (see also FIG. 2). Each ball member is accommodated in a housing 42 therefor which is secured to the underside of the extension 14, (or 16), the ball member 40 projecting through an aperture 44 formed in the extension and slightly above the surface of the extension. Accommodated within the housing 42 is a piston 46 providing a seating for the ball member 40. For urging the piston, and thus the ball member 40 upwardly, air under pressure is admitted to the lower part of the housing via a port 48, from a pipeline 50. A spring 52 is provided for urging the ball member 40 upwardly when no air under pressure is applied thereto, in order to ensure that, except when the ball member is being pressed downwardly, the aperture 44 is sealed by the ball member, and thus dirt and other injurious material cannot enter the housing 42.

The hammer arrangements 22 each are of conventional design and include a so-called hammer box 54 (FIGS. 1, 3) into which nails can be fed successively through a delivery pipe 56 from nail boxes 57 and in which the driver 24 is slidable to drive a nail fed thereto into a workpiece. As is conventional, each hammer box comprises spring fingers (not shown) by which a nail fed thereto is prevented from falling out of the block 54 until it is driven by the driver 24 as aforesaid. Also as is conventional, the hammer boxes may be grouped to provide a suitable nailing pattern, and to this end they can be arranged, for instance three abreast on rods 58,60 which are carried by the beam 20 and are supported at their outward end by support bars 62,64, these latter bars being themselves supported by a series of brackets 66 (one only shown in FIG. 1) extending across the width of the apparatus. In this manner, a segmental nailing pattern can be achieved.

Figure 1:
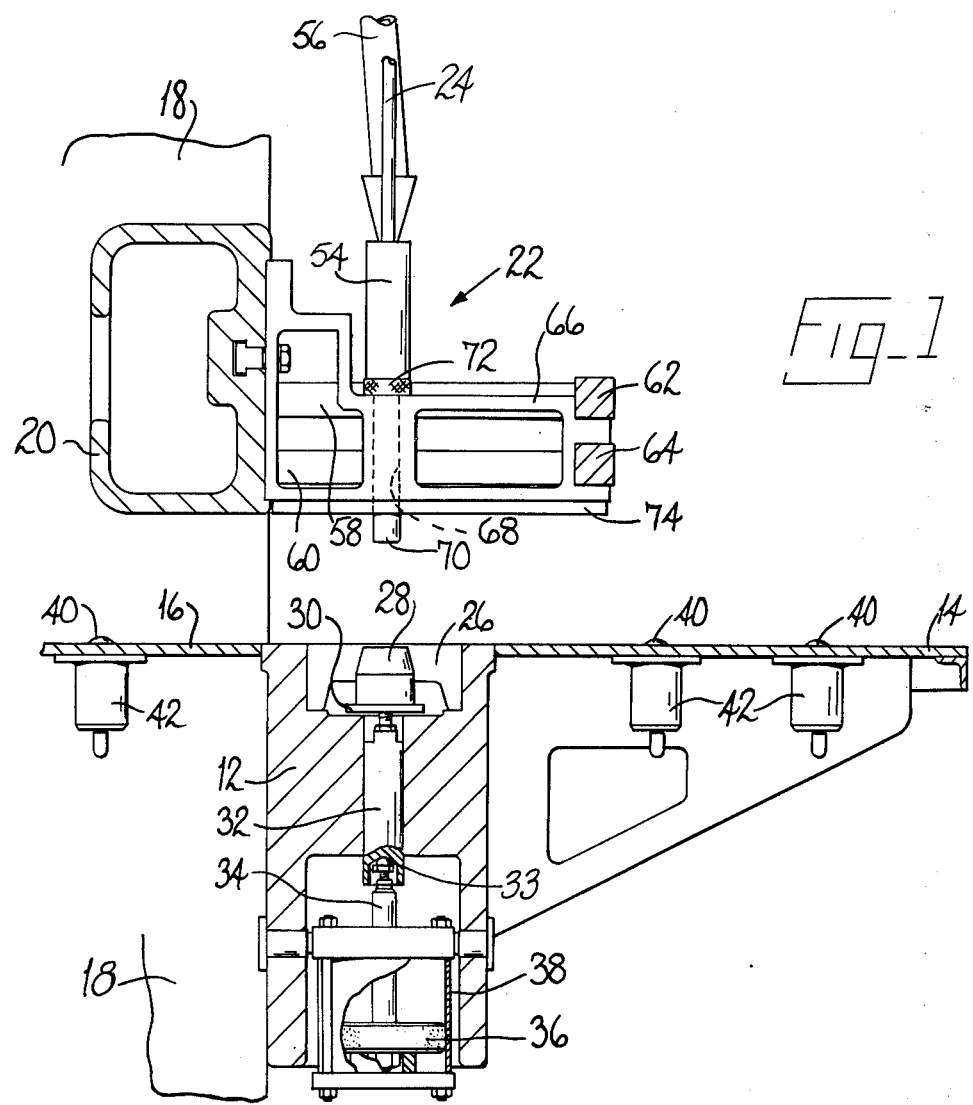
FIG. 1 is a fragmentary view, largely in section of a preferred embodiment of the invention.

The bracket 66 shown in FIG. 1 is centrally disposed in the machine and is provided with a vertical bore 68 formed therein. Accommodated within the bore, which is aligned with the drum locating pin 28, is a so-called sighting pin 70, which is slidably accommodated in the bore 68 and a head 72 of which prevents it from falling out of the bore. The sighting pin 70 is used in order to assist in the locating of a cable reel flange in position in relation to the drum locating pin, the arrangement being such that the bore formed in such cable reel flange is located beneath the sighting pin 70, and is thus located in a correct relationship with the drum locating pin 28. Because the pin 70 is slidably located, in a nailing operation, it merely retracts as the beam 20 moves downwardly to bring the hammer arrangements into surface contact with the cable reel flange being operated upon.

A presser member in the form of a plate 74 is supported by the support beam 20 so that it is in opposed relationship with the drum locating pin 28. The plate 74 is arranged to be moved to apply pressure to a workpiece on the table and thus to the pin 28 to bring its flange 30 to a position in which it is co-planar with the support surface of the work support table and the workpiece rests on the support surface. The plate 74 is moved as aforesaid, by movement of the beam 20.

FIG. 5 shows a typical cable reel flange 100 as manufactured by use of the preferred apparatus. The flange 100 comprises two layers of planks 102 (only the upper layer is visible in the drawing), the planks of the upper layer usually running at right angles to the planks of the lower layer. The planks 102 are first assembled into the general shape of a flange and are lightly secured in that condition (for example by staples inserted into the ends of the planks 102). The flange 100 is then transferred to the illustrative apparatus for nailing. The illustrative pattern of nails applied to the flange 100 as shown in FIG. 5 consists of a row of three nails 104, a row of two nails 106, a rail 108, and a nail 110. This pattern is inserted twice in one operation of the apparatus in diametrically-opposed sectors of the flange 100. Six operations of the apparatus may serve to insert nails over the whole flange 100, the lines 112 then indicating the center lines for successive operations of the apparatus. The flange 100 may have a hole 114 at the center thereof into which the pin 28 fits.

In the operation of the preferred apparatus, a cable reel flange is thus located in position on the work support table. Because of the provision of the ball members 40, it is relatively easy to slide the cable reel flange across the surface of the table. With the flange located in position by the sighting pin 70, the drum locating pin is then raised by the piston and cylinder arrangement 36,38, so that the central portion of the flange is supported on the flange 30 of the pin. The cable reel flange is then ready to be operated upon. An operator of the apparatus causes the nailing means to operate thereby causing the beam 20 to move downwardly to bring the hammer arrangements into surface contact with the cable reel flange and the drivers 24 are then actuated to drive the nails into the flange. The arrangement of the hammer arrangements is such that a segmental nailing pattern is provided extending from the center of the flange as determined by the drum locating pin 28. As the hammer arrangements engage the cable reel flange in surface contact, they force the flange down on to the table againt the pressure applied through the drum locating pin flange 30 and the ball members 40, which thus yield.

Upon retraction of the beam 20 the flange 30 of the drum locating pin and the ball members 40 again return to their work supporting positions and lift the cable reel flange from the surface of the work table, whereupon it can be readily rotated to a next nailing position by the operator of the apparatus, without the assistance of further operatives or labourers being required, the rotatable element providing a turning center about which the flange can be easily turned.

Whereas in the preferred apparatus a drum locating pin is used, it will be appreciated that in other apparatus in accordance with the invention and otherwise similar to the preferred apparatus, a spike may be used on which the cable reel flange to be operated upon is impaled as above described, such spike being itself provided with a flange equivalent to the flange 30 of the drum locating pin 28. In such an apparatus, instead of the sighting pin 70, an upper spike will also be provided.

Thus, as shown in FIG. 4, the drum locating pin 28 is replaced by a spike 28' having a flange 30' associated therewith, the spike 28' being mounted on the block 32. Furthermore, the bracket 66 carrying the sighting pin 70 is replaced by a bracket 66' carrying an upper spike 70'. The spike 70' is mounted in a piston 75 by means of a pin 73 accommodated in the piston and engaging in a groove formed in the spike. The piston 75 is slidable in a cylinder 68' formed in the bracket 66' and constituted by a bore ends of which are sealed by upper and lower caps 76,78. A lower end of the spike 70' passes through the lower cap 78, a seal being made by a sealing ring 80. A O-ring seal is also provided between the groove in the spike and the cylinder 68'.

At an opposite side of the piston 75 from the spike 70', a boss 82 is formed integral with the piston and carries an upwardly projecting rod 84 having a threaded end portion 86 onto which is screwed a sleeve 89 with which a driver head 90 is formed integral. The rod 84, sleeve 89 and driver head 90 form part of a composite rod arrangement. By the threaded engagement of the sleeve 89 and end portion 86, an adjustment of the length of the composite rod arrangement can be achieved.

The piston 75 and its cylinder 68' constitute fluid pressure operated means for controlling the heightwise position of the upper spike 70'. To this end, the cylinder is provided with an inlet port 88 at a lower end thereof through which air under pressure can be admitted to the cylinder whereby the spike 70' is raised against the influence of a compression spring 92 which is held captive about the boss 82. Exhausting air under pressure from the cylinder thus enables the spike 70' to be lowered under gravity and also under the influence of the spring 92. The pressure applied by the spring is light. The chamber formed between the piston 75 and the upper cap 76 is open to atmosphere.

In the operation of the preferred apparatus as modified and shown in FIG. 4, with the lower and upper spikes 28' and 70' held in their retracted positions by the cylinders 38 and 68', the flange 100 without a hole 114 is positioned on the work support table of the apparatus. The upper spike 70' is then released so that the spring 73 moves it down under light pressure on to the flange 100 to act as a sighting pin. Next, the lower spike 28' is raised so that the flange 100 is engaged by both spikes. A nailing operation of the apparatus is then initiated whereupon the hammer arrangements 22 engage the flange 100 and the actuator beam 19 delivers an impluse to the flange 100 and the driver head 90 such that the flange 100 is impaled on both the spikes 28' and 70' which thus provide a turning center for the flange 100. When the flange 100 has been nailed, the spikes are withdrawn therefrom by operation of the cylinders 38 and 68'. It will be understood that the plate 74 is unnecessary in the thus modified apparatus.

Having thus described our invention, what we claims as new and desire to secure by Letters Patent of the United States is:

1. Nailing apparatus for use in making cable reel flanges or the like comprising a work support table having a support surface on which a workpiece having portions which require nailing can be supported, nailing means operable to insert nails into a portion of a workpiece supported on said surface of the work support table, a rotatable element having a work-supporting surface and a work-engaging projection extending from the work-supporting surface, the rotatable element being housed in the work support table, and means for raising the element into a position in which the work-supporting surface thereof supports the workpiece and said projection provides a rotatable center about which the workpiece can be turned between operations of the nailing means to present said portions of the workpiece successively to the nailing means.

2. Nailing apparatus according to claim 1 wherein said rotatable element is rotatably mounted on said means for raising the rotatable element.

3. Nailing apparatus according to claim 2 wherein said work-engaging projection is a locating pin adapted to fit into a central aperture in a cable reel flange.

4. Nailing apparatus according to claim 2 wherein the apparatus also comprises a presser member in opposed relationship with the rotatable element, the presser member being relatively movable toward the element, in the operation of the apparatus, to apply pressure to the rotatable element to lower a workpiece supported thereby onto said support surface of the work support table thereby ensuring that the workpiece is on the support surface when the nailing means operates.

5. Nailing apparatus according to claim 4 wherein said presser member is mounted on said nailing means so that it applies pressure to the turning element upon operation of the nailing means.

6. Nailing apparatus according to claim 2 wherein said means for raising the rotatable element comprises pneumatic means energizable, in the operation of the apparatus, to continually urge the rotatable element in a direction to raise a workpiece on the work support table.

7. Nailing apparatus according to claim 6 wherein a plurality of freely rotatable ball members are housed in the work support table and, the apparatus comprises pneumatic means actuatable, in the operation of the apparatus, to urge the ball members into operative positions in which they project above said surface of the work support table.

8. Nailing apparatus according to claim 7 wherein said nailing means is operable to press a workpiece onto the work support surface thereby pressing said ball members out of their operative positions.

* * * * *